United States Patent

[11] 3,584,889

[72] Inventor Paul A. Sheets
 5833 Nagle Ave., Van Nuys, Calif. 91401
[21] Appl. No. 728,586
[22] Filed May 13, 1968
[45] Patented June 15, 1971

[54] FLEXIBLE SEALING RING
 5 Claims, 6 Drawing Figs.
[52] U.S. Cl. .................................................. 277/208, 285/231
[51] Int. Cl. ...................................................... F16j 15/24
[50] Field of Search ........................................... 277/207, 207 A, 208, 209, 210; 285/95, 231, 345, 369

[56] References Cited
UNITED STATES PATENTS
3,204,771 9/1965 Baldwin ........................ 277/208X
3,206,229 9/1965 Kramer ......................... 277/230X
3,368,830 2/1968 French .......................... 285/345X FOREIGN PATENTS
1,323,614 3/1963 France .......................... 277/209
112,747 12/1944 Sweden ......................... 277/208

Primary Examiner—Laverne D. Geiger
Assistant Examiner—Robert I. Smith
Attorney—Robert E. Geauque ABSTRACT: A seal for a connection of fluid transmitting duct elements which is formed of a resilient deformable material and having a configuration such that two substantially separate sealing surfaces are provided, the seal structure using the fluid pressure within the duct to increase seal effectiveness.

PATENTED JUN 15 1971                3,584,889

PAUL A. SHEETS
INVENTOR.

BY R. E. Geauque
ATTORNEY

3,584,889

FLEXIBLE SEALING RING

BACKGROUND OF THE INVENTION

In the assembly of duct systems for the guiding and passage of air and other fluids to and from furnaces, air blowers, heat exchangers and other air conditioning equipment, the duct systems are usually formed of several separate longitudinal sections connected together. It is desirable to connect the duct sections so as to have a leakage-free connection under which substantial varying temperature and pressure conditions can exist.

One of the major problems of an air conditioning duct system is the tendency of the ducting elements to move due to temperature and pressure variations. Also, the duct system can move when installed in a transient structure as vehicles (trucks, autos, ships and aircraft). In aircraft as compared to other vehicles this movement is greatly amplified. The reason is believed to be apparent in that an aircraft is designed as a less rigid type of vehicle as it must absorb greater vibrational movement as well as the bending moments encountered in the normal flight movements.

The movement problem in aircraft is further accentuated by the fact that such air conditioning systems may encounter a substantial variance in the ambient air. For example, the aircraft may be exposed to 80° F. on earth and a -65° F. at 40,000 feet. It is not uncommon for the two adjacent elements in an air conditioning duct system in an aircraft installation to move longitudinally with respect to one another an inch or more while also incurring substantial transverse movement.

Heretofore many different types of seal assemblies have been designed to compensate for the large amount of movement encountered in an aircraft air conditioning duct system. Usually, such a seal assembly includes a sealing sleeve which telescopically fits over the adjacent duct members and a sealing structure located between the sealing sleeve and each duct element. There has been very little difficulty encountered with the sealing sleeve itself, there being several types and each sealing sleeve accomplishing the desired result of permitting flexibility of the duct elements. However, in the seals located between the duct elements and the sealing sleeve, a rather short life span has been encountered.

One of the first types of seals that was employed was the use of the rather common O-ring. O-rings have been usually constructed of a rubber or rubber composition. It was found that to use an O-ring in a system where a great amount of movement is incurred, the O-ring does a substantial amount of twisting and finally wears itself out or ruptures, thereby destroying the seal. In an effort to improve seal effectiveness, a seal of a generally square cross-sectional configuration was employed. Although such a seal outlasted the O-ring type of seal, it also incurred a substantial amount of rocking, rolling and twisting which caused the seal to fail prematurely.

SUMMARY OF THE INVENTION

The seal of applicants's invention is so constructed to be of particular advantage when located between an element of a duct and an exterior telescopingly supported sealing sleeve. The seal of this invention includes a first portion which is to matingly cooperate with the sealing sleeve and a second portion which is to contact the duct element maintaining a fluidtight connection therebetween. The seal is to be formed of a material which is readily deformable but yet sufficiently rigid to maintain a fluidtight connection. Further, the combination of materials should be such as to preclude the seal from taking a permanent compression set when under extreme temperature and/or pressure. A type of material which is found to be satisfactory is silicone rubber reinforced radially with glass fibers. However, it is to be understood that applicant's invention is not to be limited to the particular type of material employed herein, but is to be construed to include other types of materials as dictated by environmental designs.

The first portion of applicant's seal includes a pair of sealing ribs which are disposed oppositely of each other and are to contact the sealing sleeve. It is only necessary that the sealing ribs establish a snug fitting relationship with the sealing sleeve as the pressure differential varies on the opposite sides of the seal, the first portion will be pressed into tighter relationship with the sealing sleeve, thereby precluding any leakage therethrough. The second portion of applicant's seal is in the form of an arcuate surface which is broken at substantially the midpoint by a V-shaped groove. Due to this groove, two points of contact are provided with respect to the duct element. It has been found that the two points of contact substantially increase the seal effectiveness by minimizing leakage due to compression set and other variables.

In aircraft installations it is rather common for the air conditioning duct elements and the sealing sleeves to be constructed of titanium material in an effort to save weight. Although titanium is comparatively light with respect to materiallike stainless steel, it is desirable to avoid sharp bends in titanium. Therefore, sealing sleeves formed of titanium should include a smooth curved seal retaining portion which heretofore has made it extremely difficult to retain a seal member therein while maintaining a fluidtight connection. It has been found that the seal of applicant's invention, through the use of its sealing ribs and employing the use of the pressure differential, has been of particular advantage when used in combination with a titanium sealing sleeve.

DETAILED DESCRIPTION OF THE SHOWN EMBODIMENTS

Figure 1:
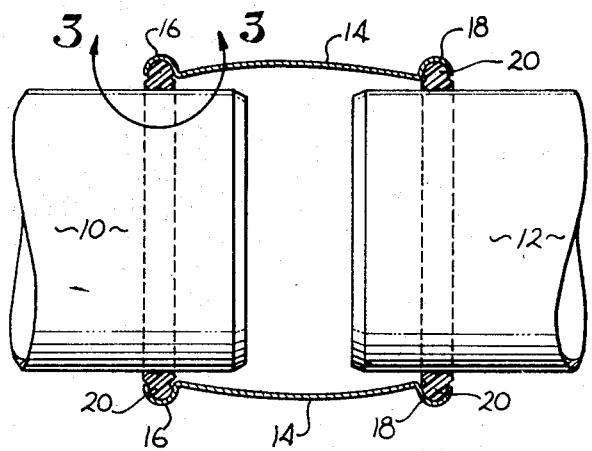
FIG. 1 is a front cutaway sectional view showing the seal of this invention in one embodiment of a fluid duct connection.
Figure 2:
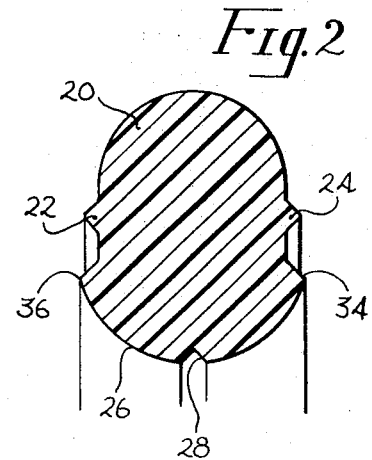
FIG. 2 is cross-sectional view of the undeformed seal of this invention.

Referring specifically to the drawing, there is shown adjacent elements of an air duct 10 and 12. Duct elements 10 and 12 are depicted here as being cylindrical, thin-walled tubes. However, duct elements 10 and 12 could be of a rectangular or square configuration or another polygonal shape. Duct elements 10 and 12 are held in a substantial in-line relationship by means of sealing sleeve 14. Sealing sleeve 14 is mounted concentric to and exteriorly of duct elements 10 and 12. Sleeve 14 includes a slight bow throughout its longitudinal length to resiliently bias its terminals 16 and 18 a slight amount toward duct elements 10 and 12. Each of the terminals 16 and 18 are identical in shape, each being substantially U-shaped. It is to be understood that terminals 16 and 18 are annular and concentric to duct elements 10 and 12 in the same manner as the main portion of sealing sleeve 14.

Figure 3:
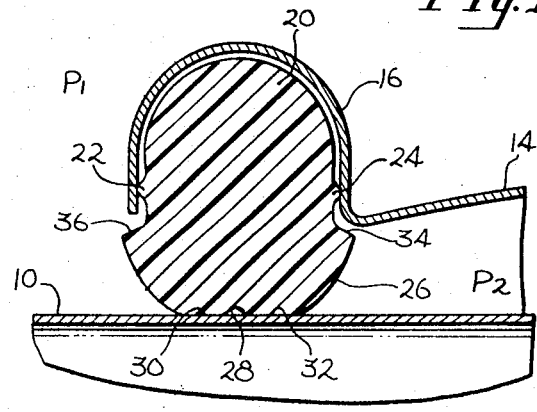
FIG. 3 is an enlarged view of the portion of the apparatus shown in FIG. 1 taken along line 3-3.

U-shaped terminals 16 and 18 are so formed as to retain a ring-shaped seal 20. Seal 20 includes a first portion which is to be retained within its respective terminal 16 or 18, the first portion including annular ribs 22 and 24. Ribs 22 and 24 are to contact its respective terminal 16 or 18 in a substantially snug fitting manner. Referring specifically to FIG. 3, when there is no pressure differential on the seal 20, only the annular ribs 22 and 24 contact the terminal. The line contact provided by annular ribs 22 and 24 is sufficient to preclude leakage from the interior of the duct through the terminal when only small amounts of pressure differential are encountered.

The second portion 26 of the seal 20 which is to come in contact with its respective duct element 20 or 12 is in the form of a smooth arcuate surface when in the noninstalled state. At approximately the midpoint of the surface length a groove 28 is provided. Groove 28 is shown as being V-shaped, however, any groove design would be acceptable which accomplishes the result of dividing arcuate portion 26 into separate sealing surfaces 30 and 32. There dual sealing surfaces are an important feature of applicant's invention and will be explained in more detail under the operation of the invention which is to follow. To increase the seal life, it has been found to be an advantage to reinforce the unrestrained portion of the seal 20 with glass fibers. The glass fibers substantially increase the shear and hoop strength of the seal 20 thereby decreasing the possibility of rupture or a natural wearing out of the seal by preventing excessive twisting and turning of the seal during duct movement.

Figure 4:
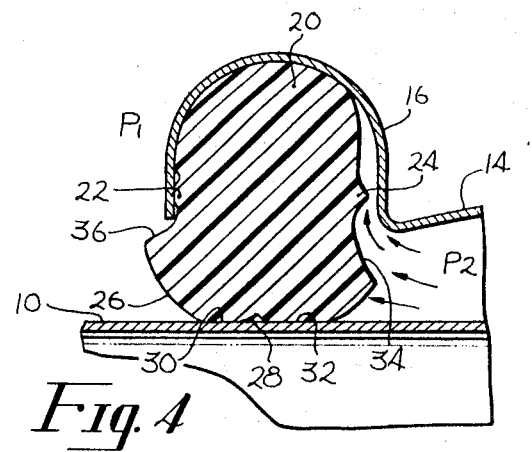
FIG. 4 is a view similar to FIG. 3 but showing the seal of applicant's invention when acted upon by a substantial pressure from the interior of the duct system.

The operation of the seal of this invention is as follows: ambient fluid pressure or air pressure is to be represented as $P_1$. Fluid pressure contained within the duct system is to be represented as $P_2$. When the ambient air pressure $P_1$ equals the duct pressure $P_2$, the seal is in the position as shown in FIG. 3. It is to be noted that the annular ribs 22 and 24 are the only portion of the seal 20 which comes into contact with the sealing sleeve 14. The second portion of the seal 20 which contacts the duct element forming sealing surfaces 30 and 32 only slightly depresses seal 20 which is adequate to provide an airtight connection therebetween. FIG. 4 depicts the configuration of the seal 20 when $P_2$ is substantially greater than $P_1$. Due to this pressure differential sealing rib 24 is not in contact with the sealing sleeve 14. The portion of the seal 20 adjacent to sealing rib 22 has been firmly pressed into contact with the terminal 16 of sealing sleeve 14. $P_2$ acts upon concavity 34 of the seal 20 and forces the seal 20 into firmer contact with the duct element. Sealing surfaces 30 and 32 tend to become more planar as opposed to a line type of contaction, thereby insuring a more positive airtight connection. As $P_2$ is decreased, the seal 20 begins to assume the configuration shown in FIG. 3. Because the two sealing surfaces 30 and 32 are provided, there is little chance that as the seal assumes its original configuration, leakage of fluid would occur between seal 20 and its respective duct element 10 or 12. Also, because of groove 28, the sealing surfaces 30 and 32 function independently in returning the total cross section of the seal 20 to its original position. It is to be known that if for any reason $P_1$ should be substantially greater than $P_2$, seal 20 will function in the same manner as previously described, but with sealing rib 22 being displaced from the terminal 16 of the sealing sleeve 14. Also, concavity 36 will function in the same manner as concavity 34.

Figure 5:
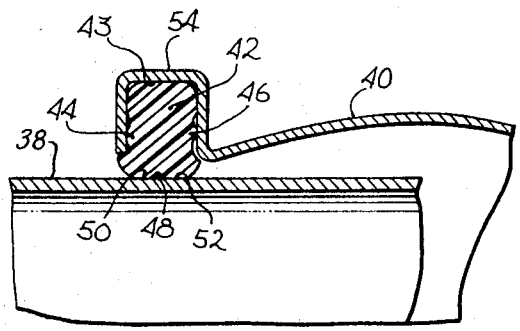
FIG. 5 is a view similar to FIG. 3 but showing the seal of this invention as would be installed in another embodiment of sealing assembly.
Figure 6:
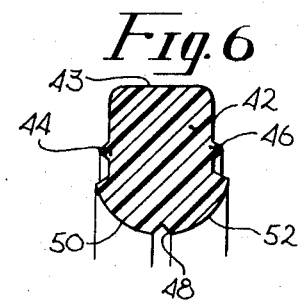
FIG. 6 is a cross-sectional side view of the undeformed embodiment shown in FIG. 5.

Referring specifically to FIGS. 5 and 6, there is shown a duct element 38, a sealing sleeve 40, a sealing member 42, the arrangement of these parts being in the same manner as the embodiment shown in FIGS. 1 through 4. Sealing ring 42 has annular ridges 44 and 46, groove 48, and sealing surfaces 50 and 52. The terminal end 54 is shown to be of a more right-angled configuration as opposed to the circular configuration of FIGS. 1 through 5. Although this right-angled configuration would be difficult to achieve when using titanium, such a configuration would be common if the duct assembly were formed of stainless steel. It is to be understood that the sealing ring 42 has a body portion 43 which is so modified to matingly fit in the right-angled configuration. The seal 20 shown in FIGS. 1 through 4 could not be satisfactorily employed in the embodiment shown in FIGS. 5 and 6. Seal 42 is to function in the same manner as does seal 20.

It is to be understood that minor modifications of the invention varying from the embodiments illustrated and described herein may be resorted to without departing from the spirit and scope of this invention, a limitation of the spirit and scope of this invention being defined only by a just and fair interpretation of the following claims.

I claim:

1. A seal assembly for establishing a fluidtight connection between a first exterior surface and a second exterior surface comprising:

a continuous formed structure of a readily deformable resilient material, said material being of a nonmetallic composition; said structure comprising in cross section a first portion and an integrally connected second portion;

said first portion comprising a substantially U-shaped perimeter insertable within a substantially U-shaped groove of said first exterior surface, said U-shaped groove having its open end facing said second exterior surface, a pair of annular ribs being integrally formed on said first portion, said ribs being located on and projecting from opposite sides of said U-shaped perimeter, each of said ribs being capable of establishing a snug-fitting relationship with said U-shaped groove of said first exterior surface and providing a fluidtight connection therebetween, said ribs spacing said U-shaped perimeter from said U-shaped groove when no pressure differential exists on said structure;

said second portion being contractable with said second exterior surface in a fluidtight connection, the perimeter of said second portion being smoothly contoured and arcuate in configuration, said perimeter of said second portion being convexly curved outwardly toward said second exterior surface and being the only contact of said second portion with said second exterior surface, a groove dividing the perimeter of said second portion at its approximate midpoint, whereby two separate surfaces of contact with said second exterior surface are provided, said first and second exterior surfaces being spaced from one another and said arcuate perimeter being out of contact with said first exterior surface, the distance of any part of said arcuate perimeter from said second exterior surface being less than the distance of any part of said first exterior surface from said second exterior surface.

2. A seal assembly as defined in claim 1 wherein:

a concavely shaped recess being located directly adjacent each extremity of the smoothly contoured and arcuate perimeter of said second portion, whereby fluid pressure is capable of exerting force upon the surface of said recess thereby assisting in maintaining said fluidtight connection between said second portion and said second exterior surface.

3. A seal assembly as defined in claim 2 wherein:

said continuous formed structure being ringlike in configuration, said first exterior surface being concentrically disposed about said second exterior surface, said second exterior surface comprising cylindrical tubing.

4. A seal assembly as defined in claim 3 wherein:

said groove dividing said perimeter of said second portion being V-shaped in configuration.

5. A seal assembly as defined in claim 4 wherein:

said first portion being substantially right-angled in configuration, said U-shaped groove being substantially right-angled at the attachment of the apex of the U to the legs of the U.